United States Patent
Hsueh et al.

(10) Patent No.: US 7,093,968 B2
(45) Date of Patent: Aug. 22, 2006

(54) LIGHT GUIDE PLATE AND LGP-BASED FFP

(75) Inventors: Hui-Ching Hsueh, Kaohsiung (TW); Yen-Chuan Chu, Kaohsiung (TW); Ying-Fu Wang, Taipei (TW)

(73) Assignee: Radiant Opto-Electronics Corporation, Kaohsiung (TW)

( * ) Notice: Subject to any disclaimer, the term of this patent is extended or adjusted under 35 U.S.C. 154(b) by 72 days.

(21) Appl. No.: 10/921,102

(22) Filed: Aug. 19, 2004

(65) Prior Publication Data

US 2006/0039167 A1 Feb. 23, 2006

(51) Int. Cl.
*F21V 7/04* (2006.01)

(52) U.S. Cl. ...................... 362/606; 362/558

(58) Field of Classification Search ............... 362/600, 362/558, 606–611, 614, 617, 621, 625, 626, 362/331; 349/63, 65
See application file for complete search history.

(56) References Cited

U.S. PATENT DOCUMENTS

| 4,460,940 | A  | * | 7/1984 | Mori ........................... 362/558 |
| 6,425,673 | B1 | * | 7/2002 | Suga et al. .................. 362/613 |
| 6,435,686 | B1 | * | 8/2002 | Gotou et al. ................ 362/623 |
| 6,709,144 | B1 | * | 3/2004 | Wang et al. ................ 362/561 |

* cited by examiner

*Primary Examiner*—Ali Alavi
(74) *Attorney, Agent, or Firm*—Leong C. Lei

(57) ABSTRACT

A light guide plate (LGP) and LGP-based flat fluorescent panel (FFP) provides consistent light source for FFP to output consistent and high luminance light source for upgrading general light emitting efficacy to facilitate subsequent use of the light source by expanding incident angle for creating a scattering belt to destroy the total reflection of the light source passing through the scattering belt thus to avail better deflection to reduce light and shade stripes created in subsequent reflection.

2 Claims, 7 Drawing Sheets

LIGHT GUIDE PLATE AND LGP-BASED FFP

BACKGROUND OF THE INVENTION (a) Technical Field of the Invention

The present invention is related to a light guide plate (LGP) and LGP-based flat fluorescent panel (FFP), and more particularly, to one that upgrades the general light emitting efficacy of the FFP by eliminating the light interference of light and shade stripes.

(b) Description of the Prior Art

Whereas the liquid crystal penal adapted in an LCD is not capable of emitting light, a flat fluorescent panel (FFP) is required to provide a light source for achieving the purpose of display.

As illustrated in FIG. 1, an FFP 1 of the prior art is essentially comprised of a light guide plate 11, one or multiple diffuser 12 and condenser 13 are disposed in sequence on the light outlet surface 111 of the light guide plate 11; multiple light guide points 113 in great number are provided on the reflective surface of the light guide plate 11; a reflector 14 is adhered to the outer side; one light inlet surface 114 as a minimum is provided on the light guide plate 11; a lamp source 15 is adapted externally to the light inlet surface 114; and the lamp source is substantially covered up by a lamp reflector 16.

In operation of the prior art as illustrated in FIG. 2, the light source from the lamp source 15 forthwith emits into the light inlet surface 114 of the light guide plate 11 due to the reflection by the lamp reflector 16. Upon entering into the interior of the light guide plate 11 by the light source, if the angle formed by the route of the light source and the light outlet 111 of the light guide plate 11 is smaller than the critical angle, the light source leaves the light guide plate 11 and varied through the diffuser 12 to achieve the purpose of condensing through the condenser 13 and finally the light source inputs toward a liquid crystal panel 2 to provide sufficient light source when the liquid crystal panel displays. Should the angle indicated by the light source in the light guide plate 11 and the light outlet surface 111 of the light guide plate 11 be greater than the critical angle, the light source indicates reflection to a reflective surface 112 to further take advantage of those light guide points 113 and the reflector 14 for reflecting its light source in seeking for the chance to output the light once again.

However, the FFP 1 of the prior art is vulnerable to the following flaws. As illustrated in FIG. 3, since the light inlet surface of the light guide plate 11 relates to a mirror without having been fogged and roughened; the incident angle is comparatively smaller when the light source from the lamp source 15 enters into the light guide plate 11. The light source arrives in the vicinity of the edge of the light outlet surface abutted to the light inlet surface 114 is prevented from leaving the light outlet surface 111 due to that the incident angle of the light source is greater than the critical angle resulting in reflection. The light guide source after the primary reflection undergoes the second reflection through those light guide points 113 and the reflector 112. Whereas the incident angle is equal to the exit angle, when the light source of the second reflection reaches once again on the light outlet surface 111, the angle indicated by the light source of the second reflection and the light outlet surface 111 is greater than the critical angle to frustrate the deflection. The repeated pattern creates the light interference to indicate light and shade stripes on the light guide plate 11, resulting in inconsistent luminance of the entire FFP and reduced total luminance to become problems pending urgent solutions by the trade.

To improve, an FFP 3 as illustrated in FIG. 4 contains a light guide plate 31; one or multiple diffuser 32 and condenser 33 in sequence on the light outlet surface 311 of the light guide plate 31; multiple light guide points 313 in great number on the reflective surface 312 of the light guide plate 31 and then covered up with a reflector 34. Meanwhile, one light inlet surface 314 as a minimum is provided on the light guide plate 31. The light inlet surface 315 is not mirrored, instead, is molded, sandblasted, etched, or tooled into fogged or roughened status. A lamp source 35 is provided to the light inlet surface 314 and is substantially covered up by a lamp reflector 36.

As the light inlet surface 314 of the light guide plate 31 is in fogged or roughened status, the angle of the light source form the lamp source 35 is expanded upon entering into the light inlet surface 314 of the light guide plate 31. Accordingly, the angle of the primary light source in the vicinity of the edge of the light outlet surface 311 abutted to the light inlet surface is smaller than the critical angle for the light outlet surface 311 to successfully become a bright area.

However, as illustrated in FIG. 5, the angle of a primary light source L1 farther from the light inlet surface 414 is gradually becoming equal to and larger than the critical angle to frustrate the light outlet and to turn into a dark area due to reflection even though the delivery of the light by the light source in the vicinity of the edge of the light inlet surface 314 abutted to the light outlet surface 311 presents no problem. The light source of that reflection is a secondary light source L2 and it though may be further reflected by those light guide points 313 and the reflector 34, the second reflection by the secondary light source L2 becomes the tertiary light source L3 due to that the incident angle of the light source is equal to the exit angle; and the attempted emission through the light outlet surface 311 by the tertiary light source L3 is frustrated since the light source is prone to be greater than the critical angle, thus is reflected again, and so on. As a result, the light interference exists to create light and shade stripes, the luminance of the FFP 3 is still not consistent, and the total luminance is insufficient with the problems found with the prior art not solved.

While the liquid crystal display is heading for larger and for full color display, more demands are put on the luminous of the FFP to point the way for future efforts by the trade. More recently, a high luminance FFP has been developed as illustrated in FIG. 6. Wherein, a light guide plate 41 is provided to an FFP 4, and the light guide plate 41 is provided with a light outlet surface 411 and a reflective surface 412. Multiple channels 413 in V shape capable of collecting the light and one light inlet surface 414 as a minimum are provided to the reflective surface. A reflector 42 is adhered to the reflective surface 412. A lamp source 43 is provided externally to the light inlet surface 414, and is substantially covered up by a lamp reflector 44. The light outlet surface is adhered with a condenser 45. As illustrated in FIG. 7, both of the light outlet surface 411 and the light inlet surface 414 of the light guide plate 41 in the FFP 4 are fogged or roughened to provide soft and consistent light outlet by the subsequent light outlet from the light guide plate 41 by omitting the installation of the conventional diffuser to save the material cost and assembly cost of the diffuser for condensing the light directly through the condenser 45 to concentrate the visual angle of luminance and significantly upgrade the luminance of the FFP 4.

However, the omission of the diffuser and the even further concentration of the visual angle of luminance lead to the even more conspicuous of the light and shade stripes on the light outlet surface, presenting a problem pending urgent solution for the FFP 4. Referring to FIG. 8, light beams from the light inlet surface partially advance in parallel for transmission into the light guide plate 41, and the remaining light beams are generally transmitted to the light outlet surface (411) upwardly and to the reflective surface (412) downwardly. For those light beams transmitted upwardly, their light emission angle has been already expanded by the fogged or roughened light inlet surface 414, the light angle of the primary light source L1 falling in the vicinity of the edge of the light outlet surface 411 abutted to the light inlet surface 414 is smaller than the critical angle and the light is smoothly deflected for the area of the primary light source L1 to become a bright area. As the location of the primary light source L1 falling on the light outlet surface 411 moves farther from the light inlet surface 414, the angle of the primary light source L1 and the critical angle of the light outlet surface 411 become larger until the deflection is prevented due to that the light angle of the primary light source L1 is greater than the critical angle. Accordingly, a dark area B is crated on the light outlet surface 411 and the light is reflected to the reflective surface 412 to become a secondary light source L2. Where as the incident angle is always equal to the reflective angle, the secondary light source is reflected once again to the light outlet surface 411 to become a tertiary light source L3. When the tertiary light source L3 is reflected once again to the light outlet surface by following the rule that the incident angle is always equal to the reflective angle, the light angle is greater than the critical angle to become a dark area, and so on. Consequently, the light and shade stripes are created to bring in the subsequent transmission of light the poor deviation to the highly luminance demanding FFP 4.

SUMMARY OF THE INVENTION

The primary purpose of the present invention is to provide a light guide plate and a light guide-based flat fluorescent panel that is adapted with a scattering belt on a light outlet surface of the light guide plate to destroy the total reflection of the light source within the scattering belt for giving the light source better chances of deflection and reducing the light and shade stripes due to repeated light reflection.

Another purpose of the present invention is to provide a light guide plate and a light guide-based flat fluorescent panel that delivers a consistent light source for the use by the FFP to upgrade its general light efficacy by having a scattering belt on a light outlet surface of the light guide plate to destroy the total reflection of the light source within the scattering belt for giving the light source better chances of deflection and reducing the light and shade stripes due to subsequent light reflection.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
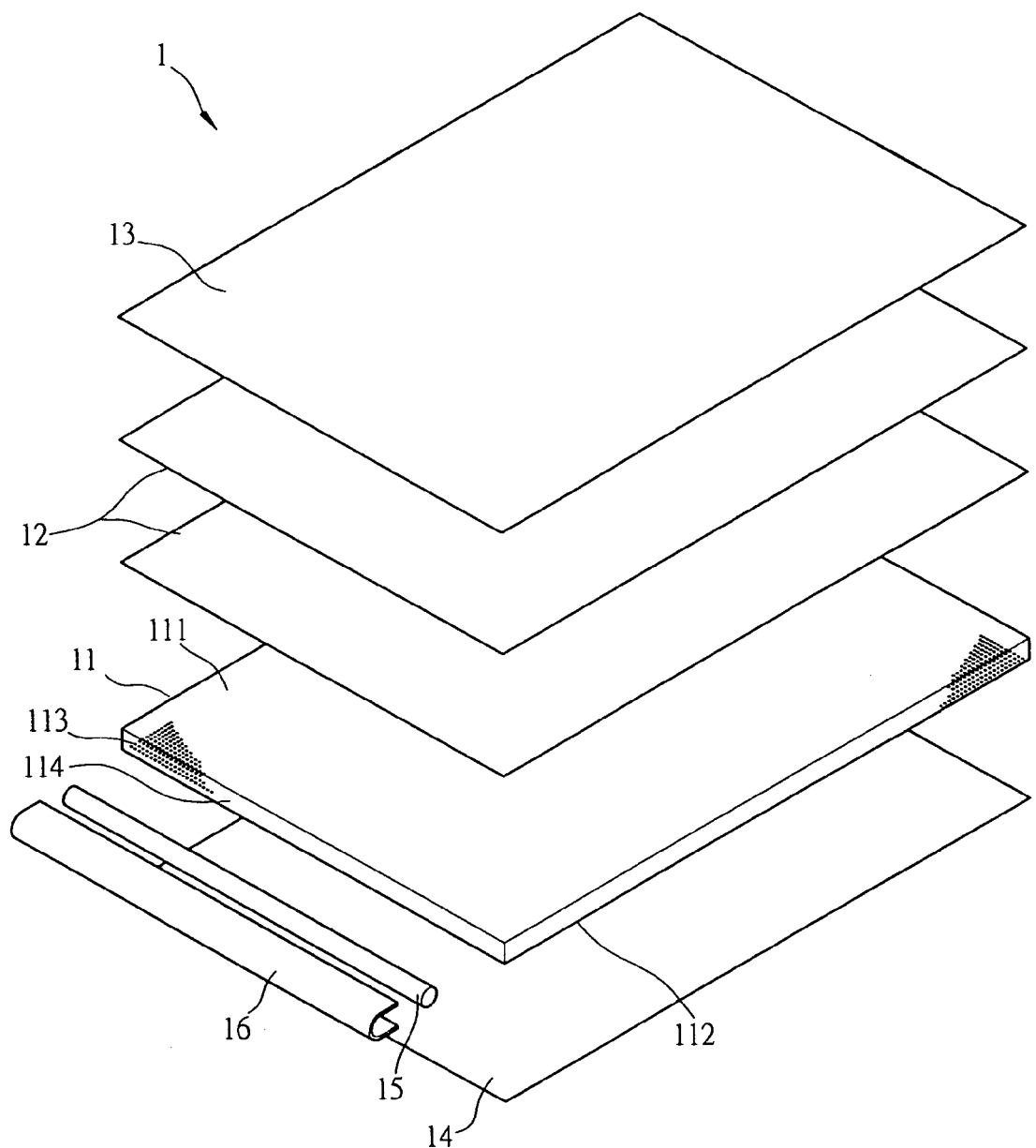
FIG. 1 is an exploded view of an FFP of the prior art.
Figure 2:
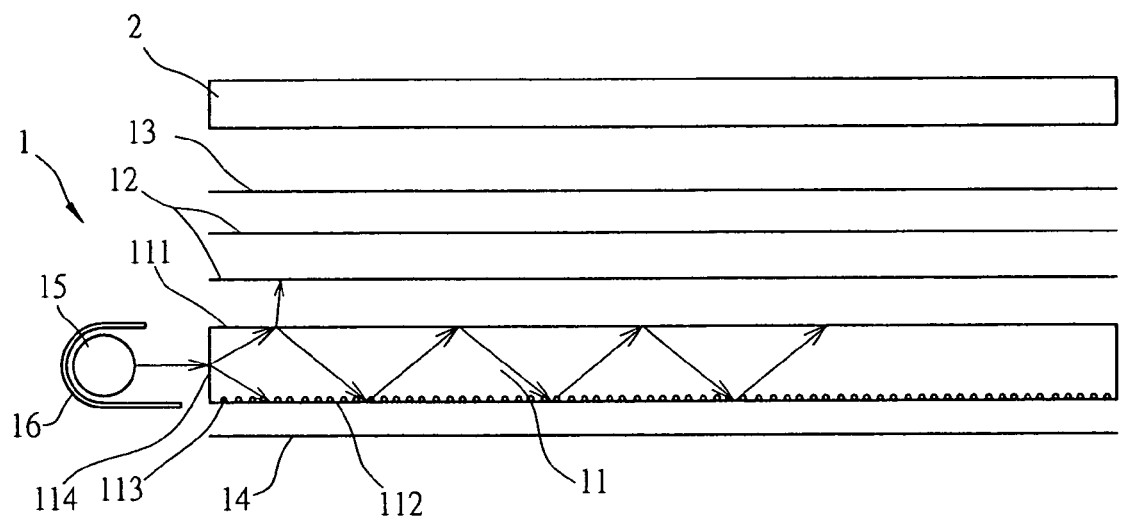
FIG. 2 is a schematic view of the FFP of the prior art.
Figure 3:
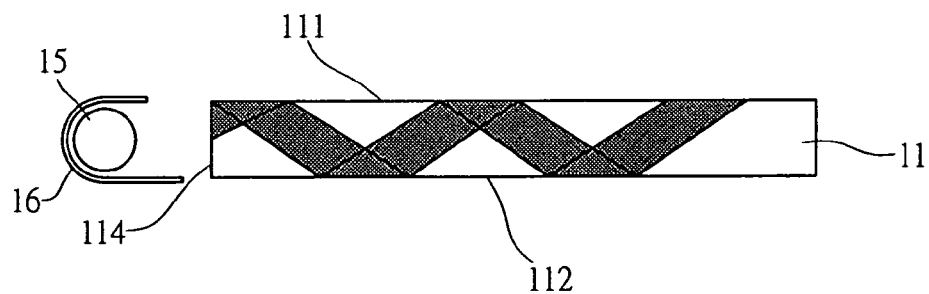
FIG. 3 is a schematic view of a light guide plate of the prior art.
Figure 4:
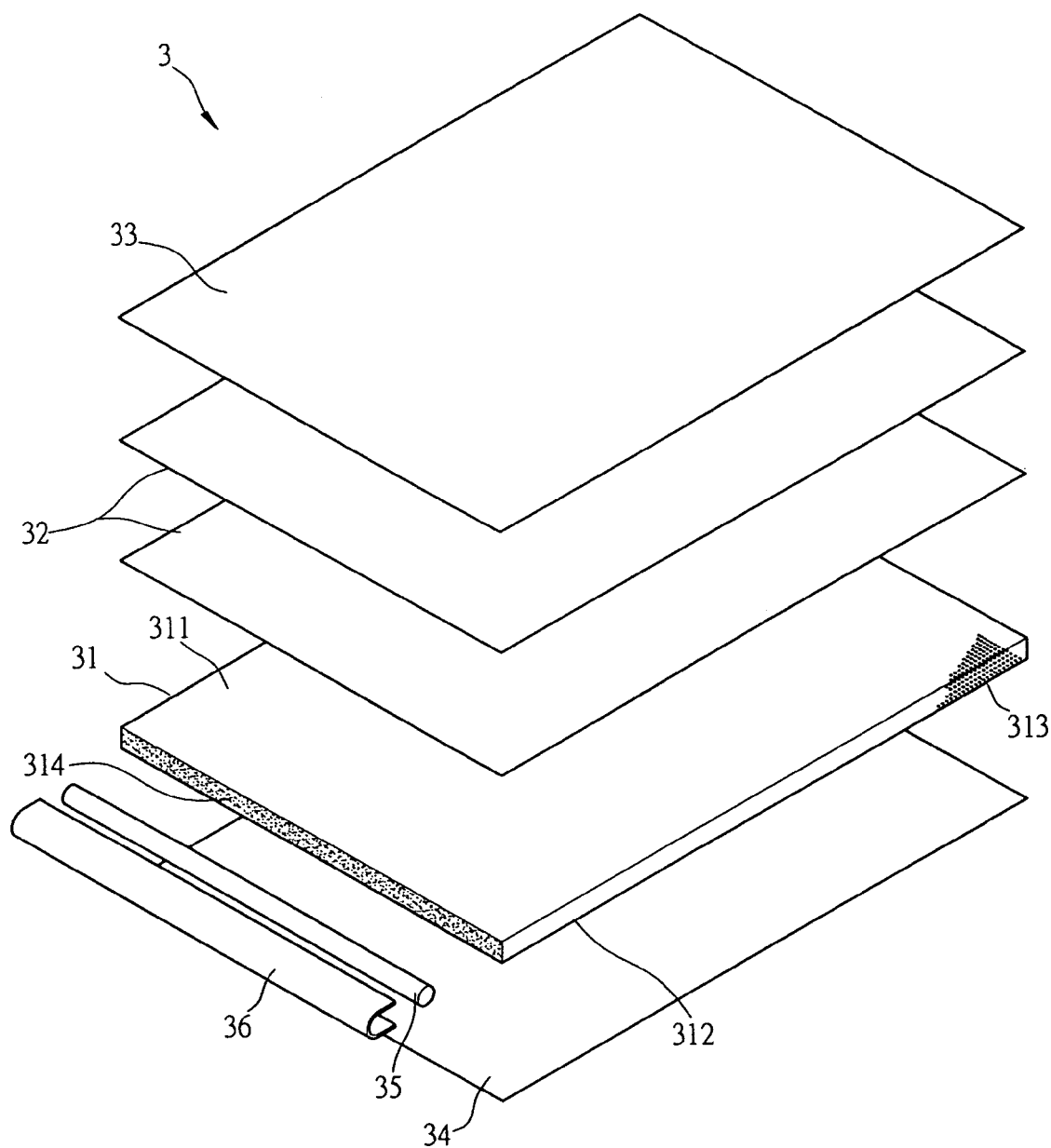
FIG. 4 is an exploded view of another FFP of the prior art.
Figure 5:
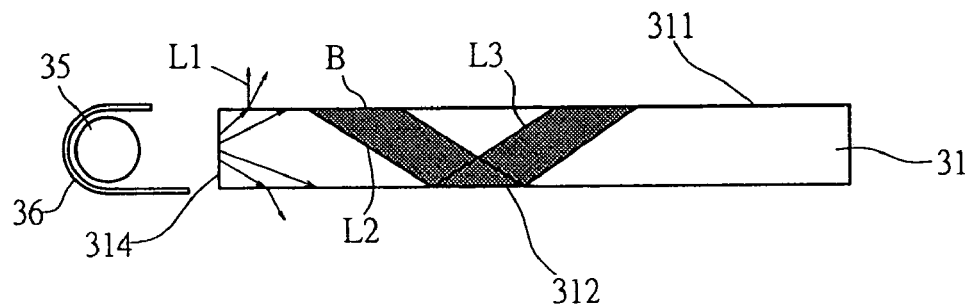
FIG. 5 is a schematic view of another light guide plate of the prior art.
Figure 6:
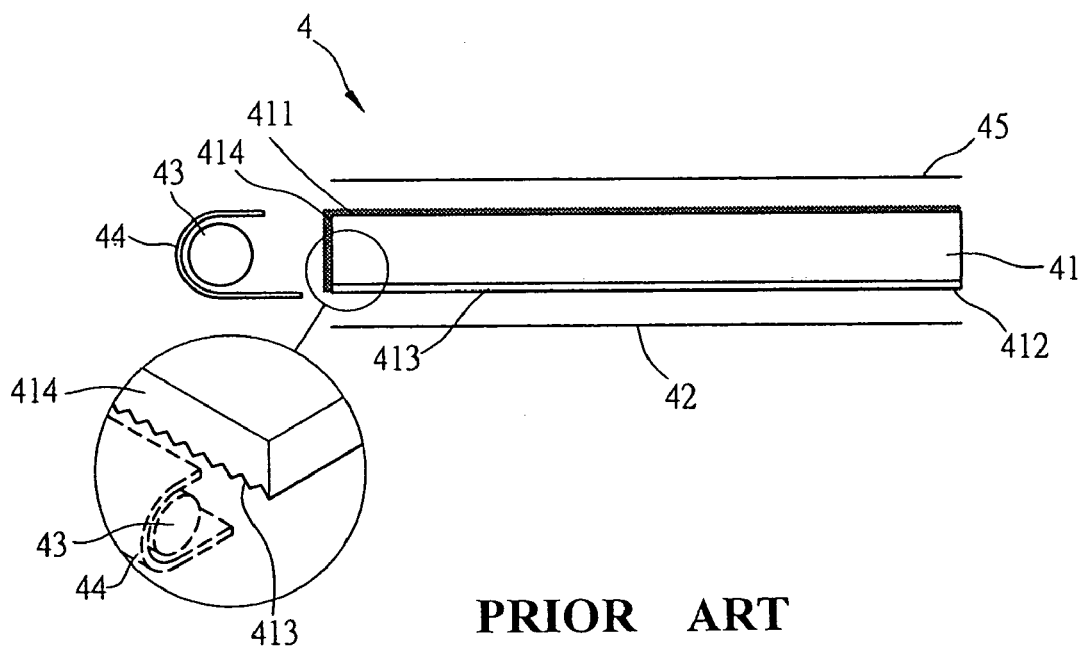
FIG. 6 is a schematic view of another FFP of the prior art.
Figure 7:
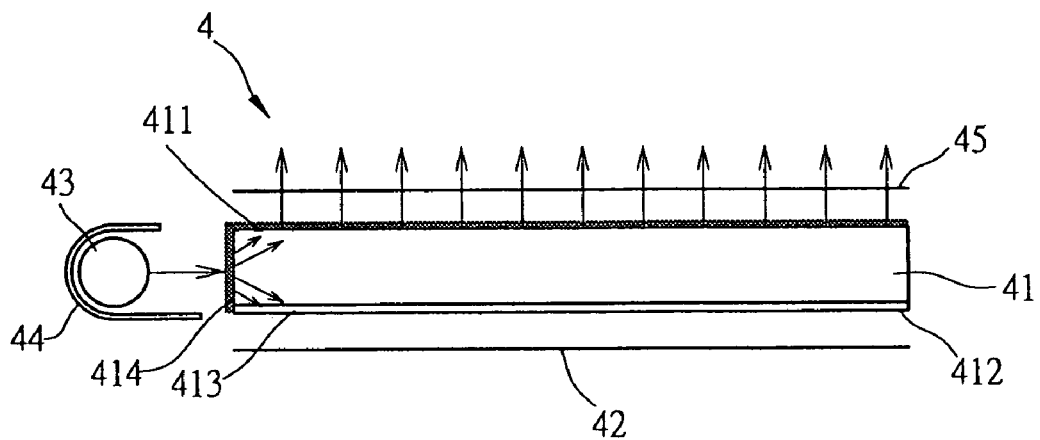
FIG. 7 is a schematic view showing that another light guide plate is in use.
Figure 8:
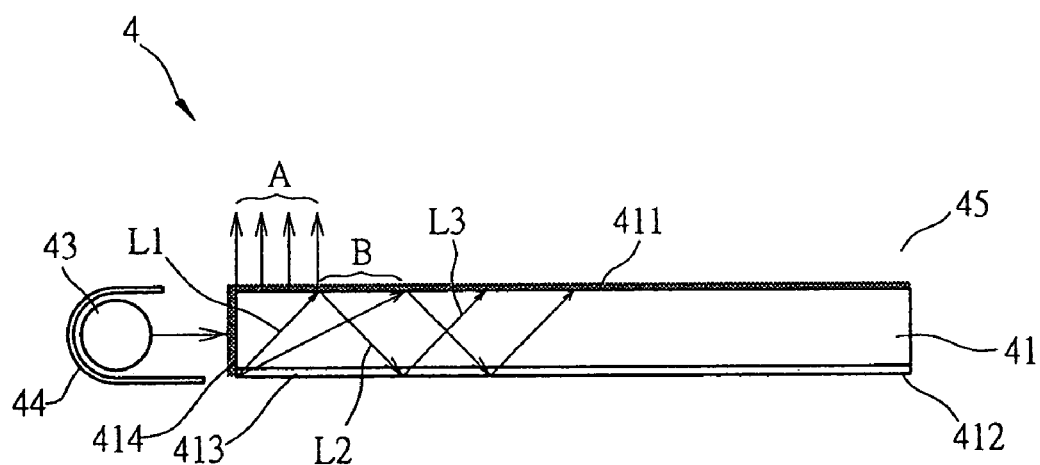
FIG. 8 is another schematic view showing that another light guide plate is in use.
Figure 9:
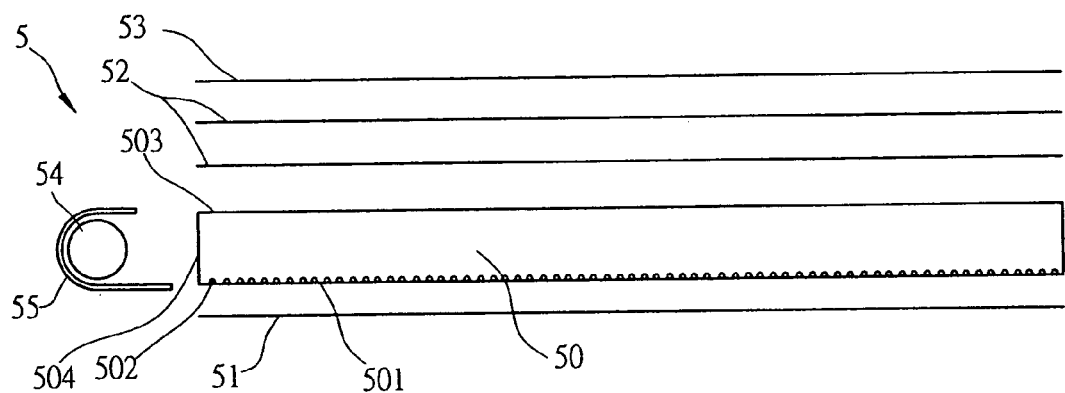
FIG. 9 is a schematic view of an FFP of the present invention.
Figure 10:
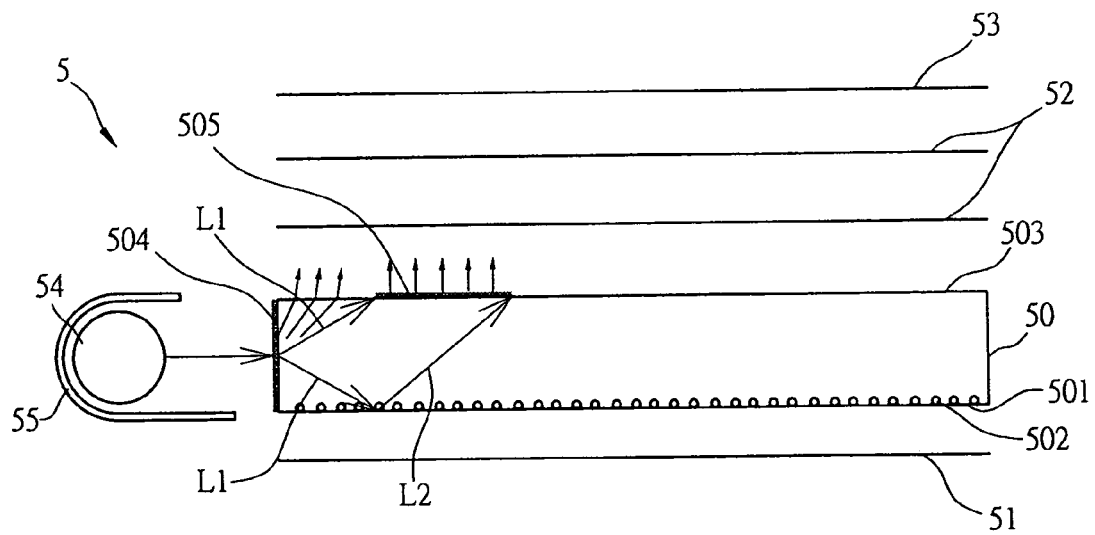
FIG. 10 is a schematic view showing a light guide plate of the present invention.

Referring to FIG. 9, a flat fluorescent panel 5 of the present invention is provided with a light guide plate 50; a reflector 51 adhered to the outer side of a reflective surface 501 of the light guide plate 50, a plurality of light guide points 502 in great number are disposed on the reflective surface 501, and one or multiple diffuser 52 and condenser 53 are arranged in sequence externally to a light outlet surface of the light guide plate 50; a lamp source 54 is provided externally to a light inlet surface 504 of the light guide plate 50 and is substantially covered by a lamp reflector 55. The light inlet surface 504 is molded, etched, sandblasted or tooled to indicate fogged or roughened status for the light source from the lamp source 54 to expand its light emission angle upon entering into the light inlet surface 504. A scattering region 505 is provided on the light outlet surface 503 and is also molded, etched, sandblasted or tooled to indicate fogged or 7242 roughened status. Meanwhile, as illustrated in FIG. 10, the scattering region 505 is present in an optimal coverage on the light outlet surface 503 and created in a length along the light inlet surface 504 and in a width starting from a point where the light emitted upwardly from the light inlet surface 504 to fall on a primary light source L1 reaches a point that is greater than the critical point, until the light emitted downward from the light inlet surface 504 to fall on the reflective surface 501 at where the primary light source L1 reaches a point that is greater than the critical point for a secondary light source L2 to reflect once again to reach within the range of the location of the light outlet surface 503.

Figure 11:
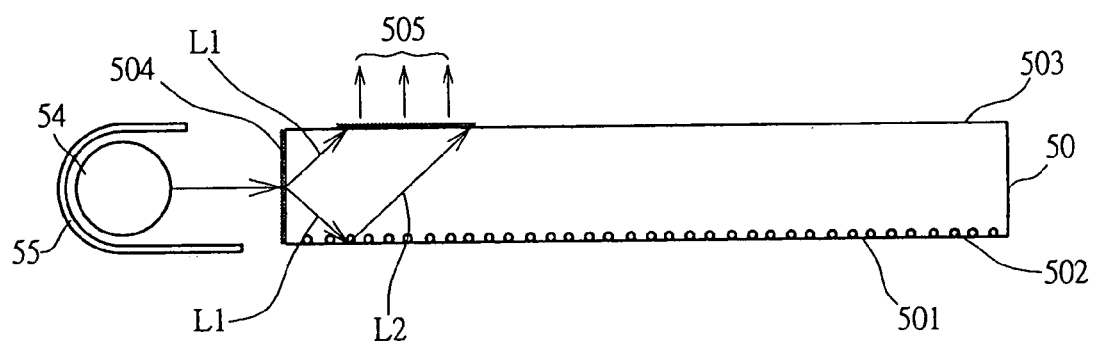
FIG. 11 is a schematic view of a preferred embodiment of the present invention.

Now referring to FIG. 11, once the light source outputted form the lamp source 54 enters into the light guide plate 50 through the light inlet surface 504, the light emission angle of the light source is expanded since the light inlet surface 504 has been fogged or roughened. Accordingly, a scattering region is provided in the range between one part of the light beams from the primary light source L1 in the vicinity of the edge of the light outlet surface 503 abutted to the light inlet surface 504 leaves away from the light inlet surface 504 to such extent that prevents deflection due to the light emission angle is beyond the critical point and the other part of the light beams from the primary light source that emits downward becomes a reflected secondary light source L2 due to that the emission angle is greater than the critical point. The scattering region 505 destroys the total reflection of the light beams from the light source falling on the scattering region 505 since the surface of the scattering region 505 is fogged or roughened, thus to correct the reflection into deflection. Therefore the deflected light is successfully delivered to eliminate the problem of developing light interference of light and shade stripes on the light guide plate 50 for the FFP 5 to upgrade its application efficacy by providing consistent light.

Figure 12:
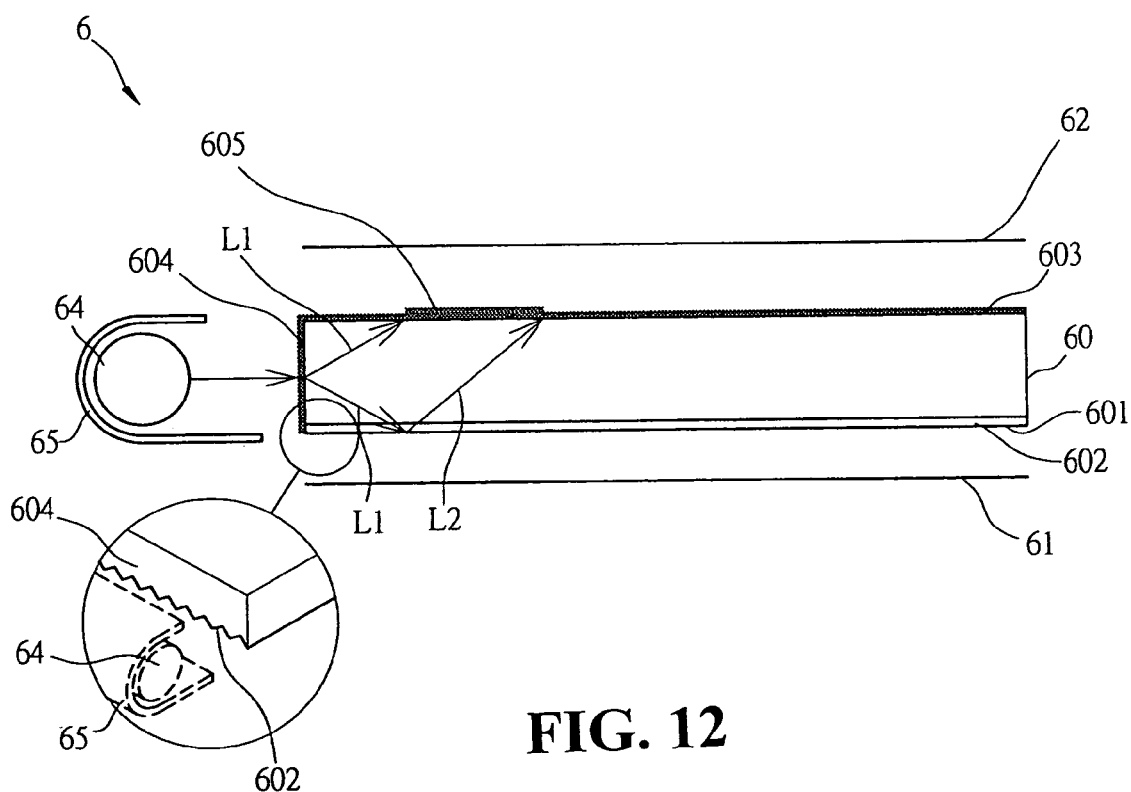
FIG. 12 is a schematic view of another preferred embodiment of the present invention.

In another preferred embodiment of the present invention as illustrated in FIG. 12, another FFP 6 that is applicable to larger size and high luminance light emission efficacy is provided with a light guide plate 60, a reflector 61 adhered to the outer side of a reflective surface 601 of the light guide plate 60, and multiple V-shaped channels 602 in great number provided with light collection function are provided on the reflective surface 601; a condenser 62 is provided externally to the light outlet surface; and a lamp source 63 is disposed externally to a light inlet surface 604 of the light guide plate 60 and is substantially covered up by a lamp reflector 64. Wherein, both of the light outlet surface 663 and the light inlet surface 604 are molded, etched, sandblasted or tooled to a consistently fogged or roughened status. A scattering region 605 is provided on the light outlet surface 603 and the surface of the scattering region 605 is similarly processed as that of the light outlet surface 603 and the light inlet surface 604 with the exception that only more roughened than other position on the light outlet surface 603. The scattering region 605 is present on an optimal coverage on the light outlet surface 603 and is created in a length along the light inlet surface 60 and in a width starting from a point where the light emitted upwardly from the light inlet surface 604 to fall on a primary light source L1 reaches a point that is greater than the critical point, until a secondary light source L2 reflects once again to reach within the range of the location of the light outlet surface 603.

Whereas the Light outlet surface 603 of the FFP 6 has been fogged or roughened, the diffuser to soften up the light source is omitted to facilitate concentrating the visual angle of luminance and upgrade the light outlet luminance. However, to avoid the problem of exaggerating the light and shade stripes on the light outlet surface 603 of the light guide plate 60 resulted from the concentrated visual angle, the roughened extent for the scattering region 605 on the light outlet surface 603 must be greater than that for the other area than the scattering region 605 so that the light source falling on the scattering region 605 is more capable of destroying the total reflection so to make it more favorable for light outlet by deflection, thus to better meet the high luminance light outlet efficacy demanded by the FFP 6 to complete the performance of high luminance from the FFP 6.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

We claim:

1. A light guide-based flat fluorescent panel comprising:
   a light guide plate having a light outlet surface, a reflective surface, and a light inlet surface, said reflective surface being provided with a plurality of light guide points, said light inlet surface being fogged or roughened;
   a reflector adhered to said reflective surface;
   at least one diffuser arranged on said light outlet surface;
   a condenser arranged on said diffuser;
   a lamp source arranged externally to said light inlet surface;
   a reflector substantially covering said lamp source;
   wherein said light outlet surface has a fogged scattering region which has a width starting from a point where light emitted upwardly from said light inlet surface to fall on a primary light source reaches a point that is greater than a critical point, until light emitted downward from said light inlet surface to fall on said reflective surface where a primary light source reaches a point that is greater than a critical point for a secondary light source to reflect once again to reach within a range of location of said light outlet surface.

2. A light guide-based flat fluorescent panel comprising:
   a light guide plate having a light outlet surface, a reflective surface, and a light inlet surface, said light inlet surface being fogged or roughened;
   a reflector adhered to said reflective surface;
   at least one diffuser arranged on said light outlet surface;
   a condenser arranged on said diffuser;
   a lamp source arranged externally to said light inlet surface;
   a reflector substantially covering said lamp source;
   wherein said light outlet surface is roughened and has a scattering region which has a width starting from a point where light emitted upwardly from said light inlet surface to fall on a primary light source reaches a point that is greater than a critical point, until light emitted downward from said light inlet surface to fall on said reflective surface where a primary light source reaches a point that is greater than a critical point for a secondary light source to reflect once again to reach within a range of location of said light outlet surface, roughened extent for said scattering region being greater than roughed extent of other area of said light outlet surface, and said reflective surface having a bottom provided with a plurality of V-shaped channels.

* * * * *